No. 780,284. PATENTED JAN. 17, 1905.
P. T. HAHN.
ROLL HOLDING CAMERA.
APPLICATION FILED MAY 7, 1904.
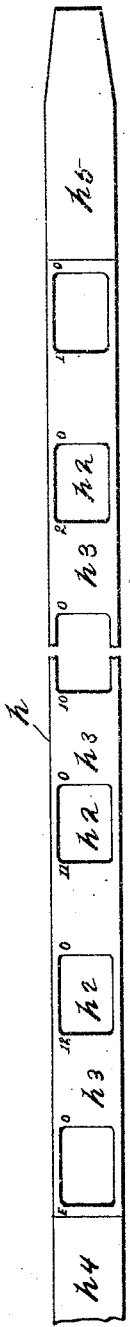
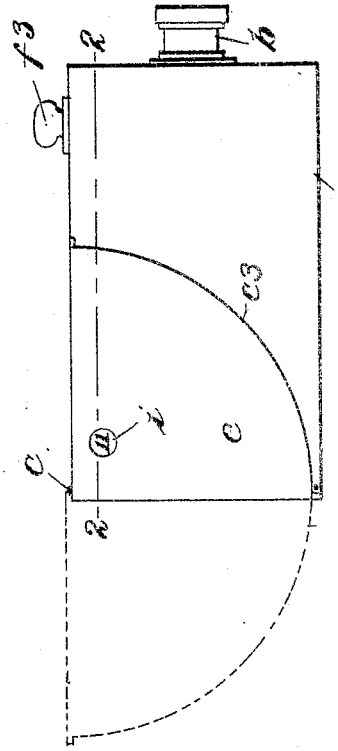
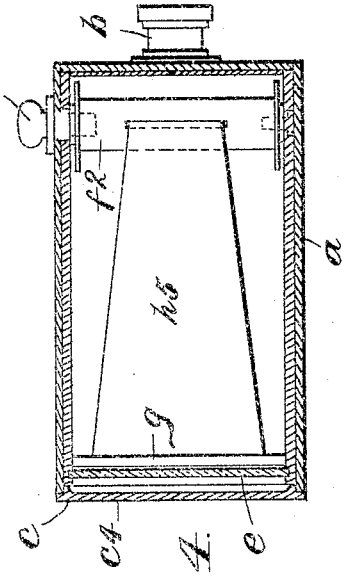
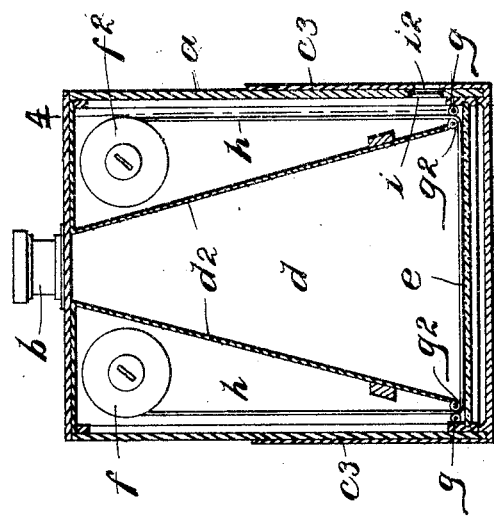
WITNESSES
A. B. Mattingly
F. A. Stewart
INVENTOR
Paul T. Hahn.
BY Edgar Tate & Co
ATTORNEYS No. 780,284.                                    Patented January 17, 1905.

UNITED STATES PATENT OFFICE.

PAUL T. HAHN, OF WOODCLIFF, NEW JERSEY.

ROLL-HOLDING CAMERA.

SPECIFICATION forming part of Letters Patent No. 780,284, dated January 17, 1905.

Application filed May 7, 1904. Serial No. 206,829.

*To all whom it may concern:*

Be it known that I, PAUL T. HAHN, a citizen of the United States, residing at Woodcliff, in the county of Bergen and State of New Jersey, have invented certain new and useful Improvements in Roll-Holding Cameras, of which the following is a specification, such as will enable those skilled in the art to which it appertains to make and use the same.

This invention relates to photographic apparatus of what is known as the "film-camera" type; and the object thereof is to provide improved means for finding the image in apparatus of this class; and with this and other objects in view the invention consists in a camera and film-strip constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of a film-strip made according to my invention; Fig. 2, a sectional view of my improved camera, showing the film-strip in position, said section being taken on the line 2 2 of Fig. 3; Fig. 3, a side view of the camera, and Fig. 4 a section on the line 4 4 of Fig. 2.

In the practice of my invention I provide a camera $a$ of a form usually employed, and this camera is provided at one end with a lens-holder $b$ and at the opposite end with a hood $c$, which is hinged at the top of the body of the camera, as shown at $c^2$, said hood comprising side portions $c^3$ and an end portion $c^4$. The end of the camera opposite the lens-holder $b$ is open save for the hood $c$, and when said hood is in the position shown in full lines in Fig. 3 said end of the camera is closed, and when said hood is in the position shown in dotted lines in Fig. 3 said end of the camera is open. Within the body of the camera is the usual dark chamber $d$, formed by side walls $d^2$ in the usual manner, and the larger end of the dark chamber $d$ is closed by a removable ground-glass plate $e$. At the opposite sides of the dark chamber $d$ and at the smaller end thereof, or at the end with which the lens-holder $b$ is connected, is placed two spools $f$ and $f^2$, and each of these spools is provided with a key $f^3$, by which it may be turned. At the larger end of the dark chamber $d$ and at both sides thereof are placed two small rollers $g$, and wound on the spool $f$ in the usual manner is a film-strip $h$, which is provided at regular intervals with openings $h^2$, between which are film-sections $h^3$. The film-strip $h$ is provided at one end with a blank $h^4$ and at the opposite end with a blank $h^5$, and in practice the end $h^4$ is connected with the spool $f$, and said film-strip is wound on said spool in the usual manner. The end $h^5$ is then passed around the larger end of the dark chamber $d$ and between the rollers $g$ and $g^2$ at each side thereof, after which said end of the strip is then connected with the spool $f^2$.

It will be observed that each of the film-sections $h^3$ is numbered at the upper right-hand corner thereof, beginning with the end $h^5$ of the strip $h$, and each of the openings $h^2$ in said strip is marked at the upper right-hand corner by the character $o$, while the beginning of the blank end portion $h^4$ or the end of the strip adjacent thereto is marked by the character $e$. In one side of the camera and adjacent to the larger end of the dark chamber $d$ and adjacent to the ground glass $e$ is an opening $i$, which also extends through the adjacent side $c^3$ of the hood $c$, and this opening is closed by a ruby glass $i^2$, which is secured in the side of the camera.

The operation is as follows: After the strip $h$ has been properly placed in position, as shown in Fig. 2 and as hereinbefore described, the spool $f^2$ is turned so as to bring the film-strip into such position that the character $o$ at the upper right-hand corner of the first opening $h^2$ in said strip can be seen through the opening $i$ in the side of the camera, and in this position of said strip the first opening $h^2$ thereof will be at the larger end of the dark chamber $d$. In order to find the image of the object a picture of which is desired, the hood $c$ is raised, as shown in dotted lines in Fig. 3, and the operator looking through the open end of the camera will see the image of the object on the ground glass $e$ if the camera be properly held, and the camera may be adjusted so as to properly locate said image on said ground glass. The hood c is then closed and the spool $f^2$ is turned so as to bring the first film-section $h^3$ of the strip $h$ over the larger end of the dark chamber $d$, which position of said strip is indicated by the number of said film-section appearing through the opening $i$. The shutter, which is not shown, is then operated in the usual manner, and the picture or image is taken on said first film-section $h^3$. It will be understood that this operation may be repeated until the entire film-strip is exhausted, after which the film-sections $h^3$ may be developed in the usual manner.

The shutter and shutter-operating devices are not shown, for the reason that they form no part of this invention; but it will be understood that the usual devices of this class are employed. The film-strip shown in Fig. 1 is not claimed in this case, but is made the subject of a separate application filed by me on the 7th day of July, 1904, Serial No. 215,573.

Having fully described my invention, what I claim as new, and desire to secure by Letters Patent, is—

1. In an apparatus of the class described, a camera provided with the usual dark chamber at the smaller end of which is the lens-holder, the larger end of said dark chamber being provided with a ground-glass plate, the end of the camera at the larger end of the dark chamber being also provided with a hinged hood, and said camera being also provided adjacent to said end and in one side thereof with an opening closed by colored glass, the end of the camera at the smaller end of the dark chamber being provided at each side of said dark chamber with two spools and a film-strip adapted to be wound on one of said spools and passed around the larger end of the dark chamber and connected with the other spool, the said dark chamber being also provided at the larger end thereof and at the opposite sides thereof with two rollers between which the film-strip is passed, substantially as shown and described.

2. In an apparatus of the class described, a camera provided with the usual dark chamber at the smaller end of which is the lens-holder, the larger end of said dark chamber being provided with a ground-glass plate, the end of the camera at the larger end of the dark chamber being also provided with a hinged hood, and said camera being also provided adjacent to said end and in one side thereof with an opening closed by colored glass, the end of the camera at the smaller end of the dark chamber being provided at each side of said dark chamber with two spools and a film-strip adapted to be wound on one of said spools and passed around the larger end of the dark chamber and connected with the other spool, the said dark chamber being also provided at the larger end thereof and at the opposite sides thereof with two rollers between which the film-strip is passed, and said ground-glass panel at the larger end of the dark chamber being removable, substantially as shown and described.

3. A camera provided with the usual dark chamber at the smaller end of which is a lens-holder the larger end of the dark chamber being closed by a ground-glass plate, and said larger end of the dark chamber being provided at its opposite sides with two rollers, the end of the camera adjacent to the larger end of the dark chamber being provided with a hinged hood, and one side thereof with an opening closed by a colored panel, and spools placed at the opposite sides of the smaller end of the dark chamber, substantially as shown and described.

4. In an apparatus of the class described, a camera including the usual dark chamber at the smaller end of which is a lens-holder, the larger end of said dark chamber being provided with a ground-glass plate, the end of the camera at the larger end of the dark chamber being also provided with a hinged hood, and at the opposite sides of the dark chamber with rollers, and said camera being also provided at the opposite sides of the smaller end of the dark chamber with spools, substantially as shown and described.

5. In an apparatus of the class described a camera provided with the usual dark chamber at the smaller end of which is the lens-holder, the larger end of said dark chamber being provided with a ground-glass plate and at the opposite sides thereof with rollers, the end of the camera at the larger end of the dark chamber being also provided with a hinged hood, and adjacent to said end and in one side thereof with an opening closed by a colored glass, and the end of the camera at the smaller end of the dark chamber being provided at each side of said dark chamber with a spool, substantially as shown and described.

In testimony that I claim the foregoing as my invention I have signed my name, in presence of the subscribing witnesses, this 6th day of May, 1904.

PAUL T. HAHN.

Witnesses:
F. A. STEWART,
C. E. MULREANY.